C. RANKIN.
CLUTCH TIMING MECHANISM.
APPLICATION FILED SEPT. 23, 1916.

1,227,545.

Patented May 22, 1917.
3 SHEETS—SHEET 1.

Inventor
Carl Rankin
By Geo. E. Tew
Attorney

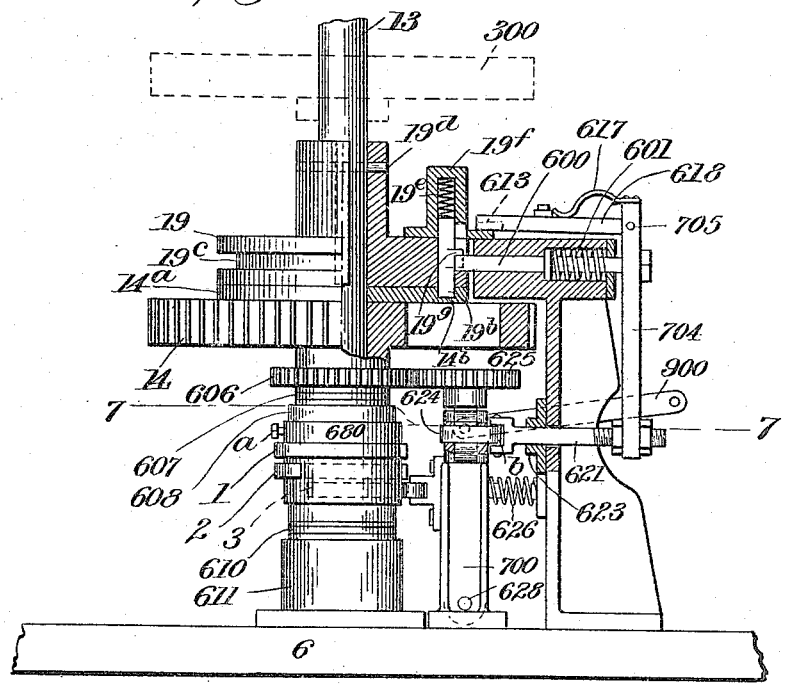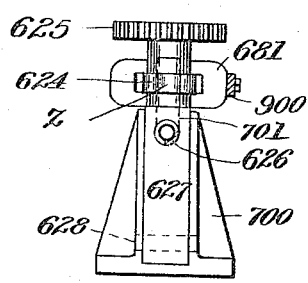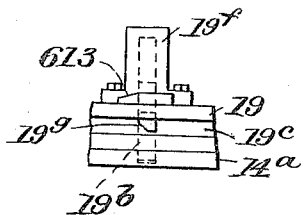

C. RANKIN.
CLUTCH TIMING MECHANISM.
APPLICATION FILED SEPT. 23, 1916.
1,227,545.
Patented May 22, 1917.
3 SHEETS—SHEET 3.
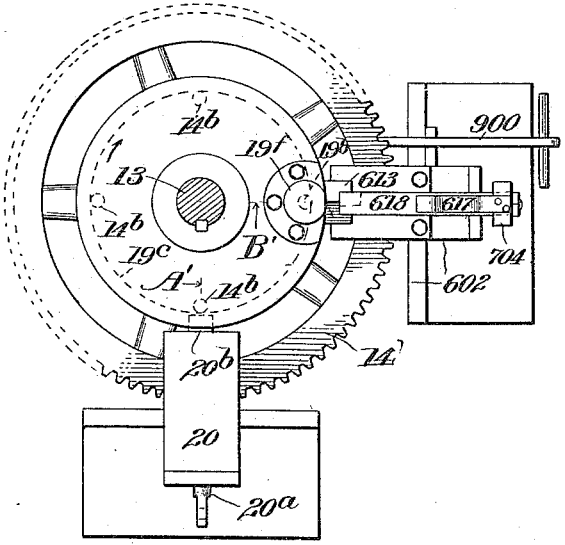
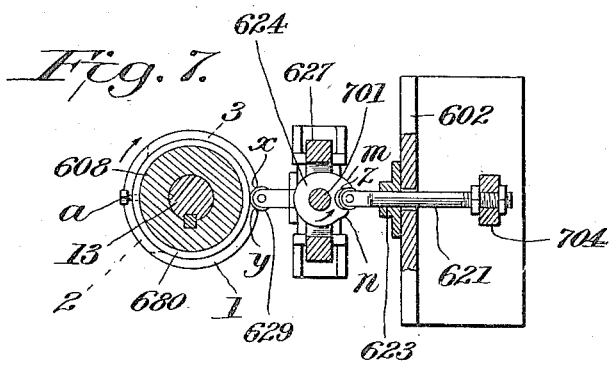
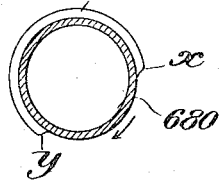
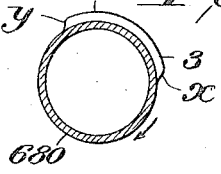
Inventor
Care Rankin
By
Attorney

UNITED STATES PATENT OFFICE.

CARL RANKIN, OF WELLSBURG, WEST VIRGINIA, ASSIGNOR TO JEFFERSON GLASS COMPANY, OF FOLLANSBEE, WEST VIRGINIA, A CORPORATION.

CLUTCH-TIMING MECHANISM.

1,227,545.   Specification of Letters Patent.   Patented May 22, 1917.

Original application filed February 11, 1916, Serial No. 77,566. Divided and this application filed September 23, 1916. Serial No. 121,865.

*To all whom it may concern:*

Be it known that I, CARL RANKIN, a citizen of the United States, residing at Wellsburg, in the county of Brooke and State of West Virginia, have invented certain new and useful Improvements in Clutch-Timing Mechanisms, of which the following is a specification.

The subject of this application is a division of my pending application No. 77566 based upon a glass molding machine, and the present invention relates to a timing mechanism forming a part of the matter disclosed in said application. This timing mechanism acts to control an intermittent clutch and stop device, to vary the dwell of the pressing plunger in the mold in which the glass is pressed.

Stated in another way, the present invention relates to an intermittent clutch connection between a motor shaft and a master or driven shaft, said connection including a variable timing device by means of which the relative starting and stopping periods of the driven shaft may be varied. The purpose of such variations will be found disclosed in said application, but in a broader aspect the present invention is capable of application to a machine of any kind where similar results are desired.

Figure 1:
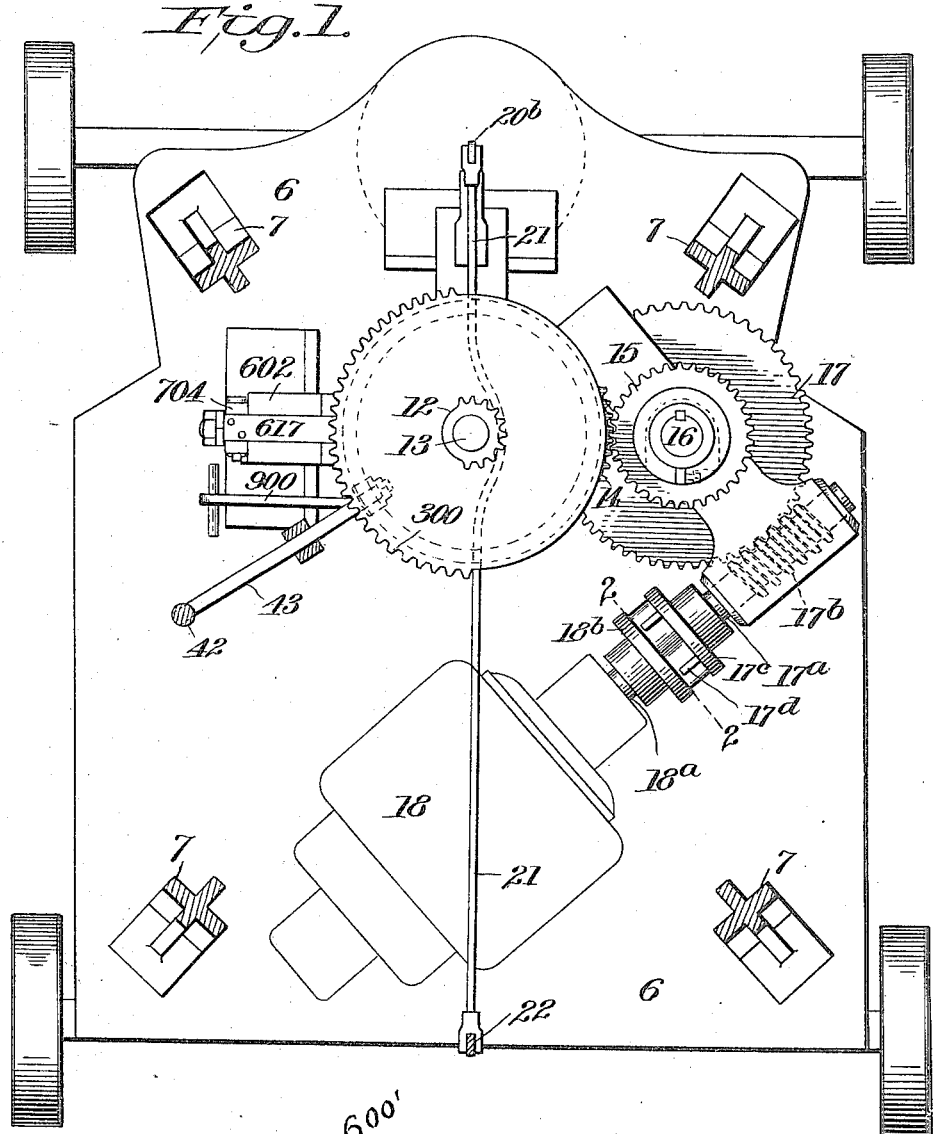
Figure 2:
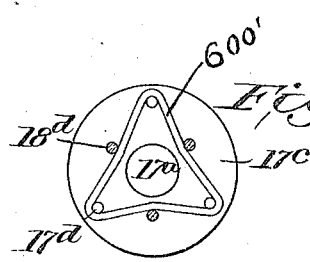

In the accompanying drawings Figure 1 is a sectional plan of the driving mechanism. Fig. 2 is a detail in section on the line 2—2 of Fig. 1, showing a "break" coupling to the motor. Fig. 3 is a sectional elevation of the timing devices. Fig. 4 is a detail in elevation showing part of the clutch. Fig. 5 is a detail in elevation of part of the timing mechanism. Fig. 6 is a plan of the parts shown in Fig. 3. Fig. 7 is a section on the line 7—7 of Fig. 3. Figs. 8 and 9 are plans of two of the timer cams.

The machine embodies a base 6 on which the mechanism including the motor is mounted. Legs 7 on the base support a table and other parts of the machine, (not shown). Gears 12 and 300 are carried at the upper end of a master or clutch shaft 13, which is the driven shaft referred to, and these gears operate mechanism unnecessary to show or describe herein but including a pressing plunger. The shaft 13 carries a loose spur gear 14 near its lower end, meshing with a pinion 15 on a worm shaft 16 having a worm gear 17 which is driven by a worm $17^b$ on the shaft $17^a$ which is coupled to the shaft $18^a$ of the motor 18 which stands on the base of the machine. The coupling is a flexible or yielding coupling illustrated in Figs. 1 and 2, to prevent shock, comprising disks $17^c$ and $18^b$ on the shafts, having respectively eccentric projecting pins $17^d$ and $18^d$ with a belt 600′ bent around the pins.

The worm shaft 16 rotates continuously and the gear 14 revolves continuously, being as stated, loose on the shaft 13. This gear 14 is fixed to or carries a disk $14^a$, which forms one member of a clutch for driving the shaft 13, the other member of the clutch comprising a wheel 19 having a peripheral groove $19^c$, and the hub of this wheel is fixed to the shaft 13 as by a pin $19^d$. The wheel 19 carries a vertical drop or clutch pin $19^b$ adapted to engage in any one of a series of holes $14^b$ in the upper face of the disk $14^a$. When the pin is so engaged the shaft 13 is rotated and when the pin is disengaged the shaft 13 stops and so do the parts driven thereby. The pin is pressed down to engage the disk by a spring $19^e$ in a housing $19^f$ on the clutch member 19.

As heretofore stated, the gear 14 rotates constantly, and when the pin $19^b$ carried by the clutch wheel 19 drops into one of the holes $14^b$ at what will be called the charging position, the machine starts, that is, the shaft 13 turns with the gear 14. The clutch is disengaged by lifting the pin $19^b$ at another or pressing position. This is done by means of a pin 600 pressed inwardly by a spring 601, and working in a casing 602 mounted on the base of the machine. The end of this pin normally projects into the groove $19^c$ in position to engage the cam lug $19^g$ and lift the pin, and the machine remains stopped until the pin 600 is retracted, permitting the pin $19^b$ to drop and engage in one of the holes $14^b$, to again pick up the shaft 13. In the complete machine the plunger operated from the shaft 13 remains in the mold, (being at this time at the limit of its down stroke) while the pin 600 holds the clutch pin in raised position, and the dwell is varied or controlled by governing the said period.

The gear 14 has secured thereto a small timing gear 606, said gears 14 and 606 being supported by a thrust bearing 607 resting on a supporting sleeve 608 keyed to the shaft 13, with a bottom thrust bearing 610 set on a block 611 on the bed plate 6, which supports the entire mechanism. A series of timing cams 1, 2 and 3 are secured in adjustable position to the supporting sleeve 608, as by a set screw $a$ in a sleeve 680 on which the cams are mounted. Pivoted between brackets 700 on the bed plate of the machine, by a pin 628, is a rocker box 627 the upper end of which carries an upright stub shaft 701 on which is mounted a gear 625 which meshes with the gear 606 at times. A spring 626 tends to swing the rocker to engage said gears, and said rocker also carries a contact roller 629 which bears against one of the cams 1, 2 or 3. These cams may be shifted up or down on the sleeve 608 to locate the desired cam opposite said roller. The shaft 701 also carries a cam 624 which bears against a roller $b$, on a rod 621 which works through a bearing in the supporting bracket 623. The rocker is "yoked" around the cam as shown at 681. The rod 621 carries a rigid arm 704 which is connected to the rod 600 and also is pivotally connected by a pin 705 to a latch or arm 618 which is pressed by a spring 617 and is adapted to be lifted by a cam projection 613 on the housing $19^t$ of the drop pin $19^b$.

The cam surfaces of the cams 1, 2 and 3 vary according to the dwell desired. In this particular machine cam 1 will cause a dwell of about two and one-half seconds, cam 2 about two-thirds of that time and cam 3 about one-third of that time, and it may be stated that by pulling the rod 900 the rocker may be swung out and the entire timing mechanism disengaged, and the machine will not rest until it has made a complete cycle, from one starting position to the next, being then controlled only by a hand-operated or "knock out" rod $20^a$, which also projects at $20^b$ into the groove $19^c$ in position to lift the pin $19^b$ by engaging the cam lug $19^g$. This rod is operated by a lever 22 and connecting rod 21.

The dwell or timing is governed by the time it requires for cam 624 to make a revolution and operate the clutch, and the operation of the timing mechanism will now be described. The position A', Fig. 6, will be referred to as the starting position, and the position B', Fig. 6, will be referred to as the dwelling or pressing position. The description will first assume that the cam 1 is being used, as that is the simplest, although the drawings show cam 3 in operative position. The part 19 and its pin $19^b$ will be referred to as the "clutch".

After the machine is started, by retracting pin $20^a$, the clutch turns until it reaches the position B' as shown in Fig. 6. Fig. 3 shows the clutch pin about to be lifted by the pin 600. When the clutch pin is lifted the clutch stops, the shaft 13 stops, and the mechanism driven thereby stops, and the plunger (not shown) being at this time at the limit of its down stroke. The dwell continues until the pin 600 is withdrawn to allow the clutch pin $19^b$ to reëngage. The pin 600 is withdrawn by the rise $m$ on the cam 624.

At the time the clutch is stopped the parts are in the position shown in Fig. 7, the roller 629 having dropped off of the rise of the cam 1 at the point $y$, and the roller $b$ having dropped off the rise $m$ of the cam 624. In this stopped position the shaft 13 has ceased to turn, and consequently the cam 1 has ceased to turn, (being carried by said shaft), but when the roller 629 runs off the point $y$ the spring 626 swings the rocker and meshes the gear 625 with the constantly rotating gear 606 which is fixed to drive gear 14. This starts the rotation of the shaft 701, and the cam 624 begins to turn in the direction shown by the arrow thereon until it makes one revolution, at which time the rise $m$ pushes out the pin 600 and permits the clutch pin $19^b$ to drop and start the clutch, the shaft 13, the cam 1, the gear 300 and the mechanism operated thereby. The machine then moves to starting position A' and the roller $b$ runs off the rise $m$ and drops into the notch $z$ thereby letting the spring 601 advance the pin 600 into the groove $19^c$ just behind the pin $19^b$, which has just advanced beyond said pin, the inward movement of the pin 600 being slightly delayed by the latch 618 to allow the pin $19^b$ to get clear, said latch dropping down against the outer edge of the cam 613 and holding the pin out until the cam travels beyond the end of the latch. Directly after the shaft 13 begins to turn, the roller 629 rides up the rise $x$ of the cam 1 and disengages the gear 625 from the gear 606. This stops the turn of the cam 624, or rather prevents it from starting, until the cam 1 makes a complete revolution. When cam 1 completes its revolution the roller 629 drops in at point $y$, the shaft 13 stops, the cam 1 stops, the gears 625 and 606 engage, and the cam 624 begins to turn and the operation is repeated. The driven mechanism therefore dwells while cam 624 makes a complete revolution.

It may be explained that the notch $z$ in the cam 624 is deep enough to permit the outward swing of the rocker without withdrawing the pin 600, which is withdrawn only by the rise $m$, and this notch also serves the purpose of preventing "spin" of the gear 625 after it is disengaged from the gear 606, and holds said gear 625 in proper or "centered" position to mesh with the gear 606 when the rocker swings in again; otherwise the gears might strike the points of their teeth together. This action is assisted by the slight rise $n$, beside the notch $z$, which prevents spinning or fouling of the gears.

Fig. 3 shows the cam 3 set for action. With this cam the dwell is only one-third as long, and consequently the gears 606 and 626 are disengaged for only one-third of the time. Assuming that cam 3 is used, the operation is this:

When the clutch has reached the point B' and its locking pin has become disengaged, stopping the rotation of said clutch, the shaft 13 and cam 3, the roller 629 is just in advance of the point $x$ of cam 3, but still allowing the gear 625 to mesh with the gear 606, and continued rotation of the gear 625 (from the gear 14) will cause the cam 624 to throw out the pin 600 as described for cam 1. As soon as pin 600 is thrown out the clutch begins to revolve, revolving shaft 13 and the cam 3, said operation causing the roller 629 to immediately ride up the rise $x$ of cam 3, which disengages the gear 625 from the constantly driven gear 606. The clutch will continue to revolve until it reaches the starting point A', and cam 3 will revolve therewith. When the clutch stops at starting point A' (by operation of rod 20ª) the roller 629 will be resting on the raised portion of the cam 3 at approximately the point $o$, it being understood that the gears 625 and 606 are out of engagement during the period of rotation of the clutch from its point B' to its starting point A'. When said clutch has reached its starting point A' it is automatically stopped by the pin 20ª and the roller 620 is still resting upon the cam 3 at the point $o$. When the machine is again put in operation through withdrawal of the pin 20ª as heretofore described the cam will take up its rotation with the clutch and shaft 13 and the roller 629 will drop off the raised portion of cam 3 at the point $y$ and as soon as said roller drops off at the point $y$ the gear 625 is again engaged with the gear 606, (said gear 606 being constantly driven) and a rotation of the cam 624 is commenced. The cam 3 continues to revolve with shaft 13 and the clutch until the clutch reaches its resting point B' where the clutch is disengaged. At the same time the point $x$ on cam 3 has reached position adjacent the roller 629 and cam 3 stops rotating with the clutch. During the rotation of cam 3, while the low part of the cam from point $y$ to point $x$ is traveling against roller 629, the gears 606 and 625 are engaged, and the cam 624 has performed approximately two-thirds of its revolution. When cam 3 stops, point $x$ on said cam has as stated reached a position close to roller 629, but gears 606 and 625 remain in mesh and continue to rotate until cam 624 completes its revolution, or approximately one-third thereof, when the rise $m$ of the cam 624 will throw out the pin 600 and allow the clutch to again become engaged. This will start the clutch again in revolution, also the cam 3, which immediately throws out roller 629 by reason of the fact that it rides up the point $x$, disengages gears 606 and 625, which stops the rotation of the cam 624 in the position shown in Fig. 7 and it remains stopped until in the subsequent operation the roller 629 runs off the drop $y$, when the cam will repeat the operation described.

The machine is caused to dwell only one-third of the time with cam 3, as compared to cam 1, by reason of the fact that with cam 3 the cam 624 is turned two-thirds of its revolution while the shaft 13 is rotating, that is, before the clutch reaches the position B', and after it reaches that position it has only one-third of its revolution to turn before the pin 600 is pulled out and the clutch reëngaged to start the machine, while in case of cam 1 the cam 624 does not start its revolution until the clutch is disengaged at position B'.

Cam 2 operates the same way as cam 3, but with a longer dwell according to the difference of the cam.

I claim:

1. The combination with a clutch including driving and driven members, of a timing mechanism controlling the clutch and including a clutch controlling cam, gearing between said cams and the driving member, and a timing cam operated by the said driven member and controlling the operation of said gearing.

2. The combination with a clutch including driving and driven members, of a timing mechanism controlling the clutch and including a clutch-controlling cam, gearing between said cam and the driving member, and a plurality of timing cams operated by the said driven member and controlling the engagement of said gearing, said timing cams being adjustable to place any one of them in operation.

3. The combination with a clutch including driving and driven members, of a timing mechanism controlling the clutch, said timing mechanism including a clutch-disengaging device arranged to disengage the clutch, a releasing cam controlling said device and adapted to operate the same to permit reëngagement of the clutch, and gearing between the driving member of the clutch and said cam.

4. The combination with a clutch including driving and driven members, of a timing mechanism controlling the clutch, said timing mechanism including a clutch-disengaging device arranged to disengage the clutch, a releasing cam controlling said device and adapted to operate the same to permit reengagement of the clutch, gearing between the driving member of the clutch and said cam, and means operated by the driven member of the clutch to control the operation of said gearing.

5. The combination with a clutch including driving and driven members, of a timing mechanism controlling the clutch, said timing mechanism including a clutch-disengaging device arranged to disengage the clutch, a releasing cam controlling said device and adapted to operate the same to permit reëngagement of the clutch, gearing between the driving member of the clutch and said cam, and means operated by the driven member of the clutch to control the operation of said gearing, said means including a timing cam adapted to engage or disengage said gearing.

6. The combination with a clutch including driving and driven members, of a timing mechanism controlling the clutch and including a releasing cam adapted to permit engagement of the clutch, gearing between the driving clutch member and said releasing cam, one of the gears being movable into and out of engagement with another, and a timing cam carried by the driven member of the clutch, and operatively connected to the movable gear to hold the same out of engagement for a certain time.

7. The combination with a clutch including driving and driven members, and a releasing pin normally in position to disengage the clutch, of a timing mechanism adapted to operate said pin and allow the clutch to reëngage, said timing mechanism including a releasing cam adapted to retract said pin from said position, gearing between said cam and the driving member of the clutch, one of the gears being shiftable into and out of engagement with another, and a timing cam operated by the driving member of the clutch, said timing cam being operatively connected to the movable gear, and having a rise adapted to disengage said gear for a certain period, and a drop adapted to permit the reëngagement of said gear for another period.

8. The combination with a clutch including driving and driven members, and a releasing pin normally in position to disengage the clutch, of a timing mechanism adapted to operate said pin and allow the clutch to reëngage, said timing mechanism including a releasing cam adapted to retract said pin from said position, gearing between said cam and the driving member of the clutch, one of the gears being shiftable into and out of engagement with another, and a timing cam operated by the driving member of the clutch, said timing cam being operatively connected to the movable gear, and having a rise adapted to disengage said gear for a certain period, and a drop adapted to permit the reëngagement of said gear for another period, and a latch connected to said pin and controlled by the driven member of the clutch, and adapted to delay the advance of the pin for a brief period after retraction.

9. The combination with a clutch comprising driving and driven members and a clutch pin, of a releasing pin adapted when in advanced position to disengage said clutch pin, a spring tending to advance said releasing pin, and means operated by the driving clutch member to retract said pin, said means including a cam operatively connected to the pin, and gearing between said cam and the driving clutch member.

10. The combination with a clutch comprising driving and driven members and a clutch pin, of a releasing pin adapted when in advanced position to disengage said clutch pin, a spring tending to advance said releasing pin, means operated by the driving clutch member to retract said pin, and a timing cam operated by the driven member of the clutch and controlling the operation of said means.

11. The combination with a clutch including driving and driven members, of means to control the clutch, said means including a cam, and gears between the cam and the driving member of the clutch, said cam having a notch, and one of the gears being shiftable into and out of mesh with another, the cam being shiftable with the movable gear, and a rod adapted to drop into said notch when the shiftable gear is disengaged, to prevent "spin" of said gear and position the same for proper reëngagement.

In testimony whereof, I affix my signature in presence of two witnesses.

CARL RANKIN.

Witnesses:
FREDERICK TEW,
L. O. GRIFFITH.